Patented Dec. 15, 1942

UNITED STATES PATENT OFFICE 2,305,168

REDUCING SUGAR PRODUCT AND METHOD OF MAKING SAME

David P. Langlois, Decatur, Ill., assignor to A. E. Staley Manufacturing Company, Decatur, Ill., a corporation of Delaware No Drawing. Application May 27, 1940,
Serial No. 337,487

5 Claims. (Cl. 127—30)

The present invention relates to the production of an edible sugar massecuite of the reducing type and has particular reference to conversion of starch into a solid massecuite product incorporating conversion by-products, the product being of pleasant taste and the process by which the product is formed involving a dual type of conversion by which the production of unpleasant massecuite by-products is avoided.

A principal object of the invention is the production without yield loss and by a dual type of starch conversion, of a massecuite which sets up as a solid crystalline mass of acceptable taste which does not require refining.

An additional object of the invention is the treatment of starch by subjecting it to an initial acid conversion to produce a sweet-tasting syrup having a dextrose equivalent analysis of more than 40 and then subjecting this syrup after a concentration operation to the action of an enzyme of the fungus type having pronounced diastatic and maltase activity to such an extent that there is produced a mother liquor having a dextrose equivalent analysis of between 80 and 90, this mother liquor then being concentrated and crystallized in its entirety to form a solid massecuite which incorporates all of the non-crystalline by-products of the conversion operation.

Still another object is to produce a novel type of starch conversion massecuite of acceptable taste and having crystallization characteristics which make the product particularly desirable for many uses without the usual centrifuging operations employed heretofore in the production of edible sugar.

These and other objects will be observed upon a consideration of the following description of a preferred embodiment of the invention.

Various types of starch conversion products have been known heretofore. One of the most commonly used starch conversion products is known as "confectioners' glucose" which consists of an acid-converted syrup of intermediate dextrose equivalent content, the syrup being non-crystallizing and of relatively mild sweetness. When corn starch is used to produce the glucose the product often is referred to as "corn syrup unmixed." Normally, the dextrose equivalent content of glucose is of the order of 40 to 45 per cent, although both lower and higher "purity" glucose have been used to some extent. If the acid conversion step is carried to such an extent that the dextrose equivalent content is of the order of 55 to 60 per cent, there develops a bitter hydrol taste and the syrup has the definite tendency toward crystallization.

In the production of crystalline dextrose as practiced heretofore the acid conversion step is carried to the point of inherent crystallization and if a purified product is to be obtained which could be used for human consumption, it has been essential to purge the crystals of the resulting massecuite by centrifuging and the like. The so-called "70" and "80" sugars which have been used rather widely in the production of alcoholic products are produced by carrying the acid conversion of the starch to the desired extent and then allowing the entire massecuite to solidify so that the crystals incorporate the mother liquor of the conversion step. These latter products are inedible due to the formation of hydrol in the acid conversion.

By the process described in the application of myself and Julian K. Dale, Serial No. 228,826, filed August 9, 1938, now Patent Number 2,201,609, there is produced a non-crystallizing starch conversion syrup by subjecting an acid-converted liquor to the action of a fungus enzyme, the dextrose equivalent content of the resulting syrup being of the order of 55 to 75 per cent.

In accordance with the present invention there is produced a composite massecuite embodying all of the products of the starch conversion reaction, which is of solid form and white color. While being of high dextrose equivalent content the product embodies certain by-products other than reducing sugars which are of advantage from a number of standpoints. The product possesses an attractive taste and requires no purging or centrifuging to render it fit for edible purposes.

In producing the new massecuite, a starch suspension is subjected to acid hydrolysis in the manner customarily employed in the manufacture of confectioners' glucose. The acid hydrolysis is carried out to produce a liquor having a dextrose equivalent content of more than 40 per cent and preferably between 40 and 60 per cent. The hydrolysis is stopped before undue quantities of undesirable taste and color-forming constituents are produced. A starch suspension of a density corresponding to about 10° to 20° Baumé (60° F.) may be employed in the conversion by acid. Where the acid conversion is carried to a relatively high extent, it is preferred to use a relatively light starch suspension, since under such conditions there is less tendency for the development of a hydrol taste than where a more concentrated starch suspension is utilized.

The starch suspension is mixed with aqueous hydrochloric acid containing about 6.2 pounds of HCl per 1,000 gallons of the suspension, the mixture being boiled at atmospheric pressure until thoroughly pasted. In the pasting step the mixture may have a pH of about 1.6 to 1.8.

The pasting operation is followed by subjecting the starch to a pressure conditioning and conversion step to the extent necessary to produce a liquor having a dextrose equivalent content of more than about 40 per cent. This operation involves the use of a pressure converter having a steam injector by which the temperature of the mixture is brought to a point corresponding to about 35 pounds gauge pressure. Preferably, the acid conversion step is controlled to produce a liquor having a dextrose equivalent content of between 45 and 55 per cent.

After the completion of the acid conversion the resulting liquor is treated with a sufficient quantity of sodium carbonate to provide a pH of about 4.6 to 5.0. The neutralized liquor is filtered and decolorized by treatment with bone char or activated carbon. After the carbon treatment the liquor is concentrated in a vacuum evaporator to between 20° and 35° Baumé. Preferably, this concentration is to between 25° and 30° Baumé.

Following the acid conversion and clarification as described, the subsequently concentrated liquor then is subjected to treatment with a saccharifying enzyme of the fungus type having maltose and diastatic activity. The enzymatic treatment is carried out at a temperature favorable to the action of the selected enzyme. Fungus enzymes generally have an optimum operating temperature of between 110° and 160° F., this temperature usually being controlled to between 125° F. and 145° F.

For secondary conversion with the fungus enzyme, the pH of the liquor is brought to about 5.5, and a fungus enzyme containing both diastase and maltase is added in such amount that the dextrose equivalent content of the liquor is raised to between 80 and 90 per cent, the time of the treatment necessary to produce a dextrose equivalent content of this order usually being between 48 and 96 hours where 0.1 to 0.8 per cent of the enzyme preparation if utilized. It will be understood that it is preferred to employ a purified enzyme so that very little foreign matter is added to the resulting sugar product. The time and quantity of enzyme employed in the process naturally will depend to some extent upon the extent of the acid conversion, the nature of the particular enzyme employed and the extent to which the secondary conversion is carried, and the other factors involved are controlled so as to provide for the secondary conversion within less than 100 hours.

There are a number of enzyme preparations available commercially in purified form which will provide the desired maltase and diastase activity. The production of fungus enzymes usually is effected by inoculating wet sterilized bran with spores of the desired fungus and drying the bran at a mild temperature after four or five days growth of the culture. The resulting enzyme may be purified by extraction from the bran with water and precipitates from the water with alcohol. Among the fungi enzymes which have been employed in the operation of the process are *Aspergillus oryzae*, *Aspergillus flavus*, *Aspergillus niger*, *Aspergillus wentii*, *Monilia sitophila*, *Rhizopus nigricans*, and *Rhizopus tritici*.

After completion of the enzymatic conversion the liquor is again decolorized by the use of bone char or activated carbon and the pH of the liquor preferably is adjusted to 4.8 to 5.0. Thereafter the liquor is concentrated to approximately 45° Baumé by vacuum evaporation.

At this concentration and with a dextrose equivalent content of between 80 and 90 per cent the resulting massecuite is seeded with crystalline dextrose hydrate or anhydrous dextrose or both, and stirred until considerable crystallization has occurred. After the partial crystallization the massecuite next is poured into molds and allowed to crystallize as a solid mass. The solid massecuite then is ready for use and may be brought into a form more easily handled by chipping or shaving the solid material into portions of small size.

The analytical data given herein in terms of per cent are calculated on the dry substance of the materials as determined by the methods of analysis set forth in the copending application referred to above, now Patent No. 2,201,609. In that application particular care was taken to prevent the acid and enzyme conversion of the syrup from going to the point of crystallizing. Crystallization was considered a detriment and was avoided by stopping the enzyme and acid conversions short of the point at which crystalline materials tend to separate out of the syrup. In accordance with the present process the acid conversion is stopped before the point is reached at which crystallization occurs, but the enzyme conversion definitely is carried past the critical point at which the massecuite becomes crystallizable into a solid mass incorporating certain by-products of the acid and enzyme conversions.

Apparently, these by-products are of different chemical nature than the by-products obtained heretofore in the production of crystallizable masses. Evidence of this difference is to be had in the fact that in accordance with the present process these by-products are not bitter tasting and do not have the taste or color characteristics of hydrol. By solidifying the entire reaction mixture the yield obtained from the conversion is 100 per cent and at the same time the product is quite edible. In previous dextrose sugar producing processes there has been a definite loss due to the necessity of purging the massecuite to produce an edible product. The liquid purged from crystalline masses of dextrose hydrate or anhydrous dextrose as produced heretofore was dark colored and of extremely bitter taste.

The particular nature of the by-products in the massecuite other than dextrose lend to the product certain advantages from the standpoints of crystallization characteristics, stability, texture, taste, rate of solubility, blending characteristics and otherwise, which make the product superior to previously known materials for various uses. For instance, the novel massecuite is usable in larger quantities in jams and jellies than are refined dextrose hydrates or anhydrous dextrose.

As an example of the operation of the process a starch suspension was subjected to acid hydrolysis in the usual manner to produce a syrup having a dextrose equivalent content of 48.4. Three liters of this syrup concentrated to 52.5° Brix and containing 1900 grams of dry substance was treated with 3.8 grams of fungus enzyme at 130° F. The dextrose equivalent content of the syrup increased rapidly at first and more slowly toward the end of the process until at 118 hours the dextrose equivalent content of the syrup had reached 87.8 per cent. The dextrose content of this material was 81.0. The conversion liquor then was treated with 1.5 per cent of activated carbon at 150° F. for 10 minutes. After filtration the syrup was concentrated to approximately 45° Baumé (85 per cent dry substance). The concentrated massecuite was seeded at 130° F. with 1 per cent by weight of dextrose hydrate and the seeded massecuite was stirred and cooled to room temperature. After about 4 hours stirring the massecuite had crystallized to a considerable extent but still could be poured. It was poured into molds and allowed to stand over night, during which time the massecuite set into a solid mass. The crystallized or solidified massecuite was removed from the molds and shaved into finely divided material.

As another example of the process a starch conversion liquor of 61.2 per cent dextrose equivalent content was produced by acid conversion of a starch suspension of a dilute nature. This liquor was concentrated to about 52° Brix and subjected to treatment with 0.1 per cent purified fungus enzyme having maltase and diastase activity at a temperature of 130° F. After 43 hours the syrup had a dextrose equivalent content of 77.1 per cent. At 67 hours the syrup had a dextrose equivalent content of 80.2 per cent. At 115 hours the enzyme conversion was stopped and the syrup had a dextrose equivalent content of 86. The converted syrup also had a dextrose content of 76.8 per cent. The massecuite was filtered, concentrated and crystallized as described before to produce a solid, white, sweet tasting sugar.

One advantage of the improved massecuite over the purified dextrose known heretofore is its substantially quicker rate of solubility. In the case of dextrose syrups produced by acid hydrolysis there is a greater tendency toward crystallization than with a sugar product produced as described herein where the dextrose contents of the two types of materials are comparable. However, the massecuite of the present invention does readily set up into a solid mass which needs no purification. While the dextrose equivalent content of tne improved product may vary between 80 and 92 per cent, the dextrose content will be found to be between 65 and 90. Below a dextrose equivalent content of about 80 per cent a massecuite will not set up into a permanent, dry, crystalline mass, even though concentrated to around 85 per cent solids.

It will be seen that the process and product may be varied considerably without departing from the scope of the invention as defined in the appended claims.

I claim:

1. The process of producing sugar products, which comprises subjecting a starch suspension in water to acid hydrolysis to produce an edible, non-crystallizable liquor having a dextrose equivalent content in excess of 40 up to 55 to 60 per cent, subjecting the resulting liquor to the saccharifying effect of a fungus enzyme having maltase and diastatic activity to produce a liquor having a dextrose equivalent content in excess of 80 to about 95, concentrating the resulting liquor, and subjecting the concentrated liquor to a crystallization operation in which the entire mass of material sets into a solid, white product of edible nature.

2. The process for producing an edible solid massecuite, which comprises subjecting a starch suspension in water to acid hydrolysis to such an extent that there is produced a conversion liquor having a dextrose equivalent content of more than 40 and less than that at which undesirable taste and color-imparting constituents are formed, subjecting the acid conversion liquor to the saccharifying action of a purified fungus enzyme to produce a final conversion liquor having a dextrose equivalent content between 80 and 95 per cent, concentrating the final conversion liquor to the extent necessary for crystallization, and producing from the resulting concentrated liquor a solid massecuite incorporating the by-products of the acid and enzyme conversion operations.

3. The process of producing a solid starch conversion reaction mixture of edible nature, which comprises hydrolyzing a starch suspension with acid to produce a sweet-tasting liquor having a dextrose equivalent content between 40 to around 55 to 60 per cent free from undue quantities of undesirable taste and color-imparting constituents, treating the acid-converted liquor with a fungus enzyme to the extent necessary to produce a liquor having a dextrose equivalent content of more than 80 to about 95 per cent, and crystallizing the entire conversion mass to form a white, edible solid.

4. The process of producing an edible solid starch conversion sugar product, which comprises subjecting a starch suspension in water to acid hydrolysis to the extent necessary to produce a non-crystallizing sweet-tasting colorless liquor having a dextrose equivalent content in excess of 40 per cent, subjecting the resulting liquor to the action of a fungus enzyme having maltase and diastatic activity to produce a liquor of a dextrose equivalent content of at least 80 to about 95 per cent which will crystallize into a solid mass when concentrated, said liquor being free from undue quantities of undesirable taste-imparting constituents, and crystallizing said liquor into a solid mass incorporating the by-products of the acid and enzyme conversions.

5. An edible starch conversion product, comprising a solid mass composed of crystallized reducing sugars having incorporated therein by-products of acid and enzyme conversions, said product resulting from an intermediate conversion of a starch suspension with an acid having a dextrose equivalent content of between 40 to about 55 to 60 per cent and a final conversion of the resulting liquor with a fungus enzyme having a dextrose equivalent content of between 80 and 95, being quickly soluble in water, and being substantially free of undesirable taste and color-imparting constituents.

DAVID P. LANGLOIS.